US010825157B2

(12) United States Patent
Moussa (10) Patent No.: US 10,825,157 B2
(45) Date of Patent: Nov. 3, 2020

(54) GLARE REDUCTION IN CAPTURED IMAGES

(71) Applicant: Apple Inc., Cupertino, CA (US)

(72) Inventor: Nader W. Moussa, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 16/134,112

(22) Filed: Sep. 18, 2018

(65) Prior Publication Data

US 2019/0102872 A1    Apr. 4, 2019

Related U.S. Application Data

(60) Provisional application No. 62/566,049, filed on Sep. 29, 2017.

(51) Int. Cl.
| | |
|---|---|
| *G06K 9/40* | (2006.01) |
| *G06T 5/50* | (2006.01) |
| *G06T 3/40* | (2006.01) |
| *G06T 7/11* | (2017.01) |
| *G06K 9/00* | (2006.01) |
| *G06T 7/30* | (2017.01) |
| *G06K 9/46* | (2006.01) |

(Continued)

(52) U.S. Cl.
CPC .................. *G06T 5/50* (2013.01); *G06F 3/01* (2013.01); *G06K 9/00221* (2013.01); *G06K 9/00228* (2013.01); *G06K 9/4661* (2013.01); *G06T 3/4023* (2013.01); *G06T 5/005* (2013.01); *G06T 7/11* (2017.01); *G06T 7/30* (2017.01); *G06T 2207/20224* (2013.01)

(58) Field of Classification Search
CPC .. G06T 5/50; G06T 5/005; G06T 7/30; G06T 7/11; G06T 3/4023; G06T 2207/20224; G06F 3/01; G06K 9/00228; G06K 9/4661; G06K 9/00221
See application file for complete search history.

(56) References Cited

U.S. PATENT DOCUMENTS

| | | |
|---|---|---|
| 8,559,753 B2 | 10/2013 | Cramblitt |
| 9,129,177 B2 | 9/2015 | Baik |

(Continued)

FOREIGN PATENT DOCUMENTS

WO    2016131075 A1    8/2016

*Primary Examiner* — Dhaval V Patel
(74) *Attorney, Agent, or Firm* — Blank Rome LLP (57) ABSTRACT

Techniques to improve the quality of captured images by reducing the effects of undesired objects (e.g., screen glare) are disclosed. The techniques may involve the use of face detection to localize the likely position of screen glare within the captured images (e.g., on a user's eyeglasses), as well as an awareness of the content that is being displayed on a display screen (or other light-projecting element projecting light into the scene) at the moment of capture of the respective image. The techniques may then model the position, size, and/or distortion of the screen contents (or other projected light) reflected by the user's eyeglasses (or other reflective surface in the captured scene environment). Once the appearance of the undesired screen glare has been modeled in the captured image, the techniques may perform an image modification operation to remove or reduce the undesired glare from the originally-acquired image in an efficient manner.

20 Claims, 9 Drawing Sheets

(51) Int. Cl.
  *G06T 5/00*   (2006.01)
  *G06F 3/01*   (2006.01)

(56) References Cited

U.S. PATENT DOCUMENTS

| | | | |
|---|---|---|---|
| 2013/0077829 A1* | 3/2013 | Cramblitt | G06T 5/10 |
| | | | 382/104 |
| 2013/0177209 A1* | 7/2013 | Baik | G06K 9/18 |
| | | | 382/103 |
| 2016/0300327 A1* | 10/2016 | Kriener | G06T 5/001 |
| 2018/0039846 A1* | 2/2018 | Grubb | G06K 9/00604 |

* cited by examiner

GLARE REDUCTION IN CAPTURED IMAGES

TECHNICAL FIELD

This disclosure relates generally to image processing techniques for captured images. More particularly, but not by way of limitation, it relates to improved glare reduction in captured images, e.g., via reducing the effects of glare caused by a reflection of light that was projected into a captured scene by a display screen or other light-projecting element.

BACKGROUND

Modern digital camera devices are commonly used for image capture, video recording, videoconferencing, and other applications. Many such devices comprise both a camera and a display screen (or other light-projecting element, such as a flash strobe, laser, or auxiliary projection screen, etc.), in addition to many other components. In some applications, the device's display screen may be used to preview the video images being acquired by the camera and/or display the video images being sent from another far-end device, such as a videoconferee. In other applications, the display screen of the device may serve as a general purpose, multi-function display for displaying arbitrary content on the display screen, e.g., a computer monitor of a device running an operating system having graphical user interface elements.

The physical arrangement of the camera with respect to the device is frequently such that the camera is pointed towards a user of the device's face while the user is looking at the display screen, whether or not the user is actively interacting with the device. As such, many users may use the device to capture video images from the camera while facing the display screen. This alignment naturally encourages specular reflection from any optically-flat surface in the captured scene (i.e., a surface that will create a specular reflection with a well-formed reflected image), including eyeglasses worn by the user, glass picture frames, mirrors, and other appropriately reflective surfaces, etc. Many users also capture video in poorly-illuminated environments, e.g., a dark indoor office environment, thus further aggravating the effect of specular reflection on their eyeglasses or other reflective surfaces in the scene. Even in cases where the user wears no eyeglasses, specular reflection can sometimes be seen in the user's eyes themselves.

Glare caused by the reflection from a display screen (or other light-projecting element) in the environment where the video image is being captured can be both distracting and undesirable. For example, the illumination from glare on a user's eyeglasses may cause occlusion of the user's eyes, which may interfere with the aesthetic goals of video conferencing and/or video image capture. In addition to being distracting from a visual standpoint, such glare may also be undesirable from a privacy standpoint. For example, as camera quality has become better and better, it has become possible to read the actual contents of a display screen in the reflection on the user's eyeglasses (or in the reflection on another reflective surface in the user's environment). This can thus lead to the unintended transmission of data or information to another user, i.e., in the form of a reflected representation of such data or information.

The physical mechanism of specular reflection is well-understood using standard optics and geometry calculations. However, in real-world scenarios, existing methods of characterizing glare reflections are mathematically intractable and time-consuming to the point that it is impractical for a real-time video capture system, e.g., a videoconferencing system, to resolve the problem of reducing the image quality effects of unwanted glare. Other existing glare reduction methods only operate on individual frames and require extensive manual input from a graphic artist in order to repair the image in an aesthetically-pleasing manner after the unwanted glare has been removed, which can't be completed at the time scale of real-time video capture.

Thus, what is needed are techniques to efficiently identify and repair unwanted glare reflections in captured video images, preferably in a manner that is further enhanced by an awareness of the content and/or composition of the light being projected into the captured scene, e.g., light being projected by a display screen of the video image capture device or by some other light-projecting element in communication with the video image capture device.

SUMMARY

The techniques disclosed herein overcome the deficiencies of the prior art video image capture systems by performing efficient glare reduction using various sources of supplemental information. Glare reduction, as used herein, includes reducing glare based on the content of the glare. The sources of supplemental information used to aid in the glare reduction process may include, e.g., face detection algorithms to geometrically constrain the location of the glare from a user's eyeglasses; information regarding the content (and/or level of privacy) of the information displayed on the user's display screen during the capture of the video image that is being glare-reduced; and/or information regarding the composition of other sources of light being projected into the scene by one or more other elements in communication with the video image capture system. The methods described herein are particularly advantageous because they may be efficiently implemented to operate in real-time (i.e., as part of the image processing pipeline). However, the methods disclosed herein could also be implemented to operate as a post-processing stage, i.e., after image acquisition has completed and the images have been stored.

In one embodiment described in further detail herein, the glare reduction process comprises: obtaining a first captured image at a first time; obtaining a first "content image" representing the contents of a display screen or projected light pattern (which pattern contains some content) at the first time; detecting a first undesired object (e.g., one or more regions of unwanted screen glare and/or reflections of patterns of structured light or other light projected into a scene) in the first captured image, wherein the first undesired object comprises a reflection of a first object in the first content image (e.g., a reflection of a display screen's contents, or some portion thereof, on a user's eyeglasses); and then modifying the first captured image in an efficient, content-aware fashion, e.g., to remove or partially remove the first undesired object from the captured image. In some embodiments, there may be multiple content images (e.g., a content image based on the content of a display screen and a content image based on a projected light pattern) corresponding to a captured image, for which multiple undesired object or glare removal routines can be run, or which can be combined into a single, "hybrid" content image.

In other embodiments, the removal or partial removal of the first undesired object may be achieved by creating a modified representation of the first content image, e.g., based on the size and geometry of the first undesired object in the first captured image. For example, the modified representation may be created by applying one or more transformations to the first content image (e.g., affine transformations, translations, and/or mesh or warp transformations), such that the modified representation is scaled, positioned, and/or geometrically distorted to have a "best fit" with the first undesired object in the first captured image. In some such embodiments, the transformations to be applied to the modified representation may be determined by performing one or more iterative parameter sweep searches (in serial or in parallel, depending on implementation needs), in order to find the transformation parameters that provide the best fit with the undesired object in the first captured image.

According to some embodiments, the removal or partial removal process may comprise a modification of the captured image, wherein the amount or location of the glare removal can be determined using the information contained in the modified representation of the first content image. For example, an image subtraction operation (e.g., a pixel-by-pixel subtraction operation) may be used to subtract the modified representation of the first content image from the first captured image at the location of the first undesired object. In other embodiments, the portion of the first captured image where the undesired object has been removed or partially removed may subsequently be blurred, blended, and/or noise-reduced, based on heuristic algorithms to improve the aesthetic appearance of the corrected image after the removal or partial removal.

According to further embodiments, a constrained glare detection process may be used, e.g., a process that performs a coarse spatial search for specular glare within the boundaries of a detected face within the image. The glare detection process may, e.g., use pixel luminance (i.e., brightness) data to efficiently locate the most likely glare regions within the boundaries of the detected face. Once the coarse glare location is determined, the glare position can be further constrained by calculating the spatial-correlation between the image captured by the camera and the content image.

According to still other embodiments, the undesired object in the captured image may comprise a reflection of structured or patterned light projected from some other element (i.e., other than a device display screen) that is in communication with the device that captures the image, e.g., light projected from a laser; an infrared (IR) light; a projector; and/or other source of structured light. As long as the image capturing device is in communication with the light-projecting element (and the light-projecting element projects known and/or characterized patterns of light with one or more characteristics that can be used in identifying and removing the patterns of light), the content-aware glare reduction techniques described herein may also be applied to determine a best fit between the reflection of the undesired structured light content and the actual composition of the structured light content coming from the light-projecting element. The undesired structured or patterned light content may also then be subtracted from the image content in an efficient manner.

A computer executable program to implement any of the methods outlined above may be stored in any non-transitory storage device that is readable and executable by a computer system. A device comprising one or more light-projecting elements; an image sensor; a memory communicatively coupled to the image sensor; and one or more processors operatively coupled to the image sensor and the memory may also be programmed to implement one or more of the improved glare reduction methods summarized above.

DETAILED DESCRIPTION

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

Figure 1A:
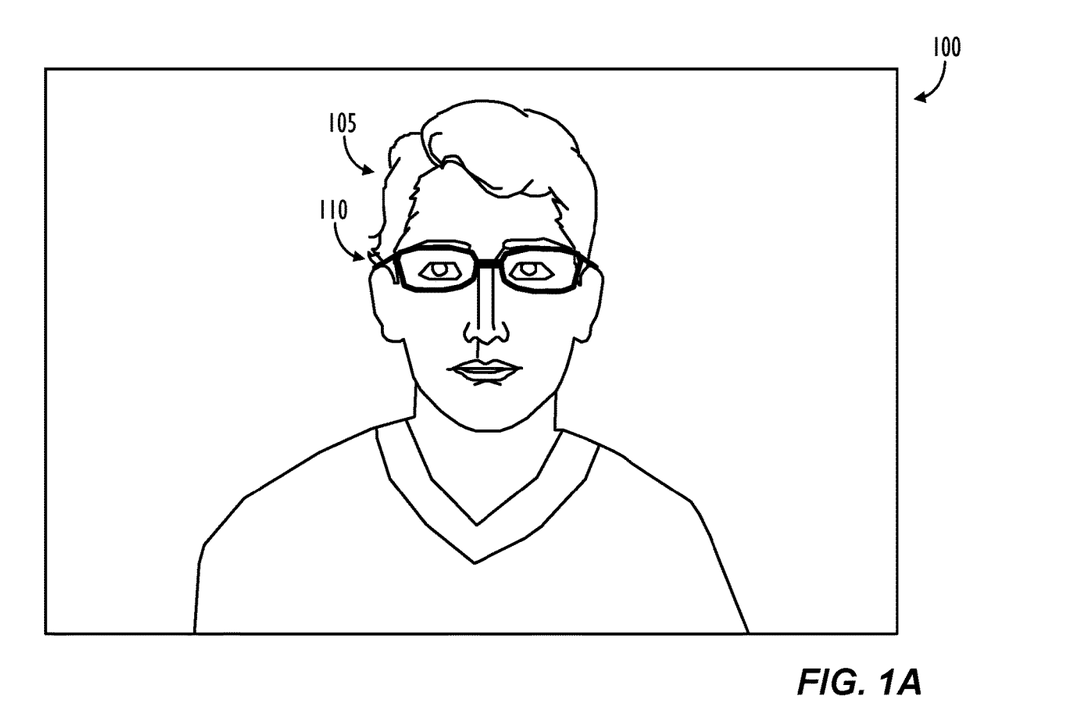
FIGS. 1A-1B illustrate the effect of specular reflection on a user's eyeglasses, in accordance with one or more embodiments.

As mentioned above, one instance where undesired glare may be found in captured images is in a user's eyeglasses, e.g., caused by the reflection from a display screen (or other light-projecting element) in the environment where an image of the user is being captured. Referring now to FIG. 1A, an exemplary captured image 100 of a user 105 wearing eyeglasses 110 is shown. In exemplary captured image 100, there is no apparent glare, e.g., in the eyeglasses 110 of user 105 (or anywhere else in exemplary captured image 100). Thus, there may be no need to perform any glare reduction techniques on an image such as exemplary captured image 100.

Figure 1B:
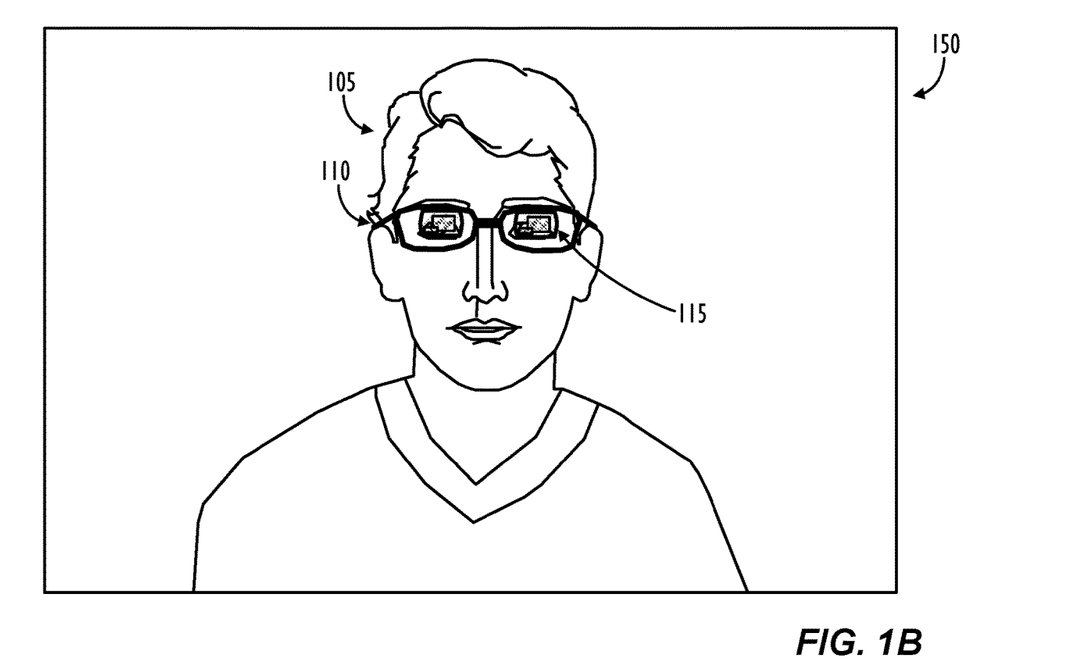

Referring now to FIG. 1B, an illustration of the effect that this disclosure seeks to reduce is shown in exemplary captured image 150. A captured image of a user, such as user 105, especially one who is wearing eyeglasses 110 and capturing video images in a dark scene environment, may have strong glare 115 that is caused by a specular reflection of the image capture device's display screen being reflected in the user's eyeglasses 110. Such glare 115 may be both aesthetically undesirable (e.g., due to obscuring the user 105's eyes), as well as undesirable from a privacy standpoint, e.g., due the contents of the display screen that user 105 is looking at inadvertently being transmitted, e.g., in the form of glare reflections, to a recipient of captured image 150.

Figure 1C:
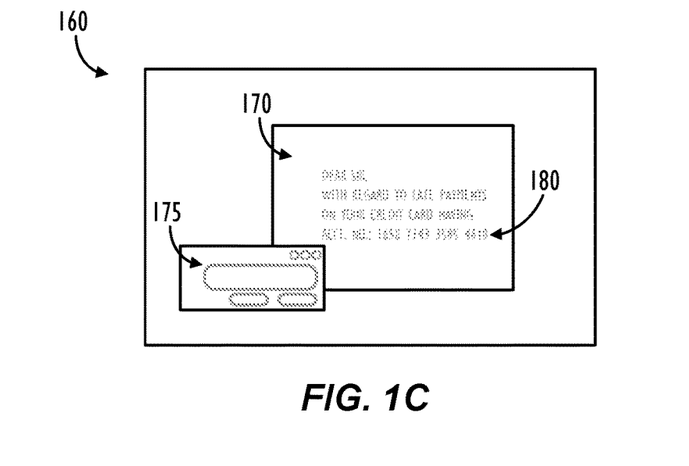
FIG. 1C illustrates an exemplary content image, in accordance with one or more embodiments.

The content of a display screen at a given moment in time, e.g., at the time of an image capture, is also referred to herein as a "content image." As will be discussed further herein, having knowledge of the composition of a content image may be useful to aid an electronic device in performing the glare removal techniques described herein, e.g., so that the regions of glare may be matched, at a pixel level, with the screen content that caused the glare. Referring now to FIG. 1C, an exemplary content image 160 is shown, in accordance with one or more embodiments. Content image 160 represents the contents of an image capture device's display screen at a given moment in time. Content image 160 may thus comprise one or more of: an electronic document (170); a graphical user interface object (175); and/or a string of alphanumeric characters (180). As will be described further below, a content image may also comprise a pattern of structured light, e.g., rather than (or in addition to) the contents of a display screen in the user's environment. It may be desirable to remove all or only a portion of the reflection of a content image 160 from the captured image, depending on the implementation and use case scenario.

Figure 1D:
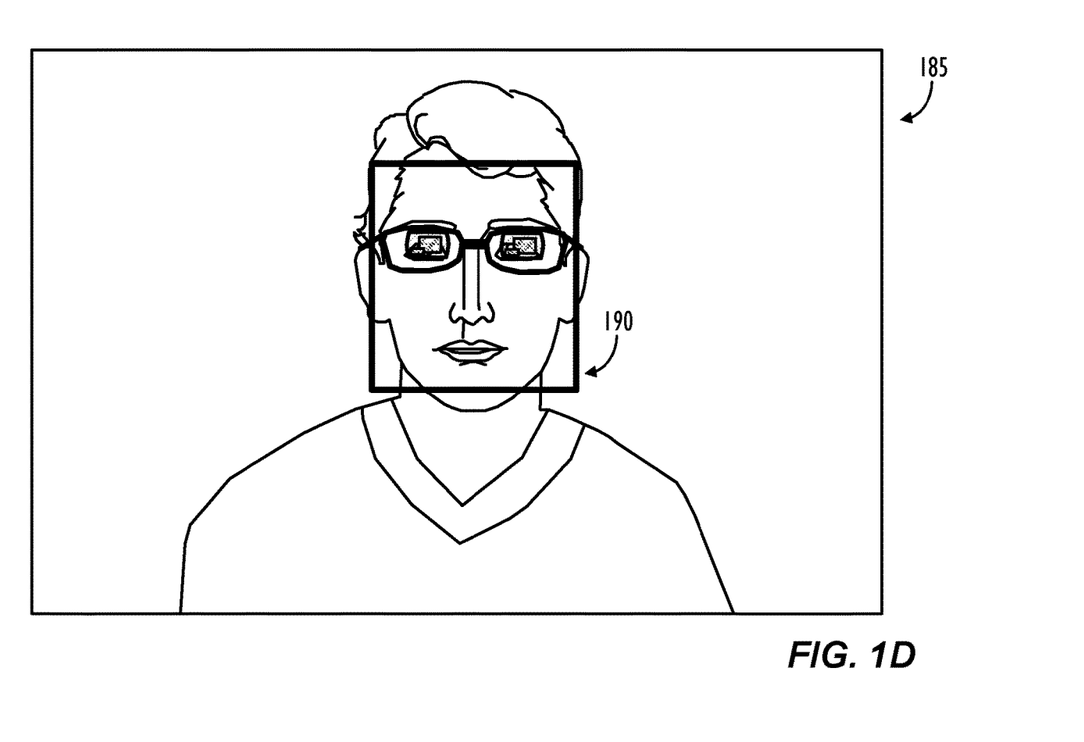
FIG. 1D illustrates an exemplary face detection bounding box, in accordance with one or more embodiments.

Depending on the size of a captured image, locating potential glare regions can be a computationally expensive task that is difficult to perform in real-time. Thus, according to some embodiments, to increase efficiency, it may be desirable to consider only a subset of the captured image in the search for potential glare regions. Referring now to FIG. 1D, an exemplary captured image 185 having an exemplary face detection bounding box 190 is shown, in accordance with one or more embodiments. The face detection bounding box 190 may, e.g., be determined via an image processing analysis (e.g., a per-pixel or per-feature analysis) or via analysis of a scene depth map in conjunction with pattern or shape matching. According to some embodiments, in order to make the glare detection process more efficient, the search for glare may be localized to only the portions of the captured image that are within the face detection bounding box 190. This insight comes from the fact that, if undesired glare is present in an image, it is likely to come from a pair of eyeglasses that are worn on the face of a user that is in the captured image (or the user's eyes themselves). Of course, other sources of image glare beyond a user's eyeglasses may be present in a captured image, so the use of a face detection bounding box to limit the glare detection search process would not locate such non-eyeglasses-related sources of glare in the image. As will be explained in further detail below, however, the non-eyeglasses-related sources of glare may also be detected in the image, e.g., by a trained object detection algorithm, which may similarly provide a bounding box for the detected object of interest, thereby providing an efficiency improvement similar to the face detection bounding box methods described above.

Figure 2:
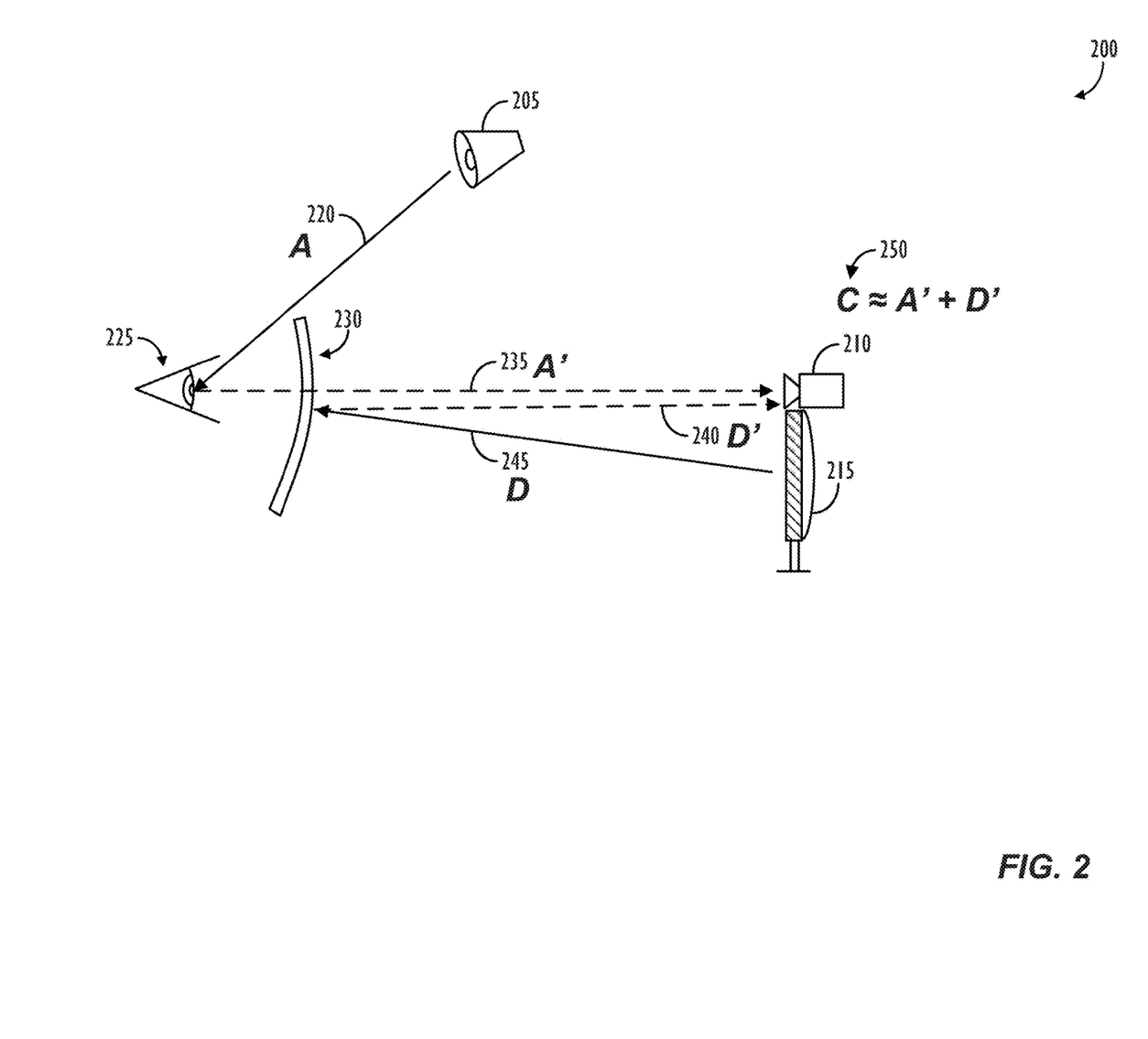
FIG. 2 illustrates a basic physical model of specular reflection and the transmission of photons, in accordance with one or more embodiments.

In order to remove or reduce the effects of reflected glare in an image captured by a camera in communication with an electronic device, it may be helpful to create a mathematical model accurately reflecting the amount (and/or sources) of light that will be captured by the camera in its present environment. Referring now to FIG. 2, a basic physical model 200 of specular reflection and the transmission of photons is illustrated, in accordance with one or more embodiments. The light captured by a camera (210) in communication with a display screen (215) (or other light-projecting element) may consist of photons from several sources. For example, the light captured by camera (210) may include photons initially emanating from an ambient light source, A (220), or photons initially emanating from a display screen, D (245). In particular, the ambient light, A (220), emanating from one or more ambient light sources (205) may bounce off of the user (225) in the scene and be returned to the camera (210) in the form of reflected ambient light, A' (235). In addition to reflected ambient light A' (235), the camera (210) may also capture a component of light that is emitted by the device display screen, D (245), and then returned to the camera (210) in the form of reflected display screen light, D' (240), e.g., after specular reflection from the user's eyeglasses (230).

Thus, the total amount of light captured by camera (210), C (250), may be modeled as a summation of the reflected ambient light, A' (235), and the reflected display screen light, D' (240). In a real-world scenario, some light may also be transmitted through a user's eyeglasses (230), but, in preferred embodiments described herein, the eyeglasses (230) will be modeled as a perfectly reflective mirror surface (i.e., 100% reflection, 0% transmission). This simplification reduces the computational complexity during the image correction stage. Of course, in other implementations, if so desired, the various reflective surfaces in the captured scene may be modeled with reflectivity levels closer to their real-world counterparts (e.g., 50% reflectivity, 80% reflectivity, etc.).

In still other real-world scenarios, i.e., depending on the scene configuration, the intensity of ambient light, A (220) may be bigger or smaller than the device display screen light, D (245), or the reflected display screen light, D' (240). For example, in some scenes, a user may be in a dark room where the only light source is the display screen (215). In such a scene, the ambient light, A (220), may effectively be zero, in which case it is known that any glare is likely coming from a light source whose composition is completely known to the computer, i.e., the display screen.

In other scene configurations, e.g., if the ambient light (205) is controlled by the image capture system, or is otherwise in communication with the image capture system, such as in a home using "smart home" technology to control lighting sources, additional glare reduction techniques can be used to remove glare based on the ambient light, and/or the information about ambient light, which may come from smart home system, and which may be used to provide additional inputs to the content-aware glare reduction techniques described herein, e.g., to remove a particular colorcast, tint, or temperature of light, etc. As for ambient light, A (220), traveling from the source (205) of such ambient light to the camera (210), that light will hit a different part of the camera (210)'s image sensor than the light coming from the user (225), and, thus, that light does not add to the view of the user and does not need to be corrected for.

It should also be noted that diffuse reflection may also be corrected for in captured images, but the process is more performance-intensive, since diffuse reflection is less spatially-correlated to its light source than is spectral reflection. With diffuse reflections, the magnitude of the gradients of the reflections is likely to be much smaller, so the convergence of the method would be slower, and it would likely take more time to minimize the residual error. However, diffuse reflections tend to be less visually distracting than specular, and thus have less capacity to transmit information unintendedly, e.g., in the form of a reflection.

Figure 3:
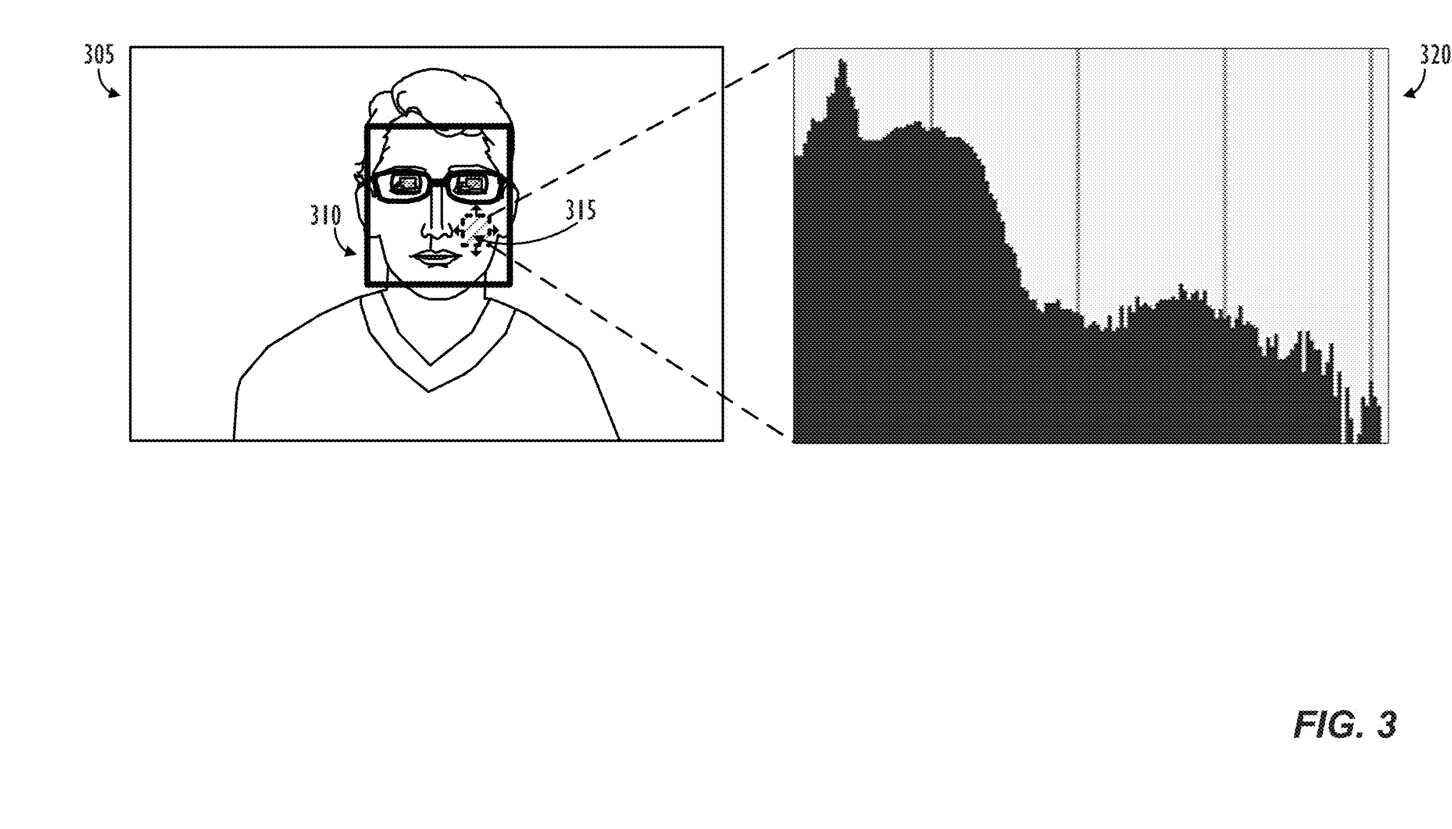
FIG. 3 illustrates a spatial alignment process utilizing luminance histogram information, in accordance with one or more embodiments.

Returning to the scenario of a captured image possessing unwanted glare regions, wherein a subset of the captured image has been identified as most likely to contain the potential glare regions, a first step in some embodiments of the glare reduction process is to identify where within the identified subset of the image the most likely glare region is actually located. Referring now to FIG. 3, a spatial alignment process 300 utilizing luminance histogram information 320 is illustrated, in accordance with one or more embodiments. FIG. 3 represents a method for sweeping a test window (315) across an image (305), seeking regions with high luminance (or other desired image property), i.e., the regions within the image (or subset of the image) that are most likely to possess glare in the image. The process of searching for high luminance (or other glare-indicative property) regions within the image may be computationally expensive, especially in images with many millions of pixels, thus, it may be desirable to limit the spatial extent of the search process to increase computational efficiency. As mentioned above, in some embodiments, the test window search within the image may be constrained to be within a subset of the image, e.g., the coordinates a face bounding box, as returned by a face detection process executed over the image. In some embodiments, the spatial-sweep statistics for a region at a given test window position may be compared to "global" statistics for the entire image (or to the region bounded by the face detection bounding box, i.e., in the event that a search has been limited to only the position of the detected face).

According to some embodiments, a glare-containing region may be identified at the location of any test window (315) position(s) having luminance information (e.g., in the form of luminance histograms 320) that satisfies one or more criteria. In a preferred embodiment, the criteria for the glare-containing region may comprise at least a predetermined number of pixels exceeding a threshold value of luminance (or other glare-indicative property). For example, in some preferred embodiments, glare-containing regions may be identified at any test window position(s) having a sufficient quantity of pixels (e.g., 10% of pixels) at greater than a threshold level (e.g., two standard deviations) above the global mean luminance value for the entire image (or greater than a threshold level above the global mean luminance value for just the user's face, e.g., if only the face is being searched over). As may be understood, different embodiments may use different thresholds to establish where the likely glare-containing regions in the image are located, based on, e.g., a given implementation's tolerance for false-positives (or false-negatives) in the identification of glare-containing regions. If desired, multiple adjacent (or near-adjacent) identified glare-containing regions may be combined or processed further to form a new glare-containing region or regions to further speed up the spatial alignment portion of the glare reduction process described herein (e.g., by reducing the total number of identified glare-containing regions to attempt to fit the content image with). As may now be understood, the glare region identification process illustrated in FIG. 3 may be used to establish a coarse accuracy for the general location of the eyeglasses glare (or other forms of glare) located in the captured image.

As will be described in further detail below, correctly identifying the likely glare-containing regions in a captured image allows the glare reduction to run much more efficiently. For example, because the embodiments described herein utilize content-aware glare reduction techniques to enhance the performance of the glare reduction process, if the identified likely glare-containing regions in the captured image do not actually represent a reflection of the screen contents of a display screen (or other light-projecting element) at the moment of image capture, the glare reduction process will have a lower likelihood of finding a match (i.e., a best fit) between the content image and the identified likely glare-containing regions, which may make the image subtraction process that is used to implement the actual reduction of glare perform inaccurately or produce an aesthetically unpleasing result. Thus, according to some embodiments, a best fit threshold may be used and, if a fit is not found that exceeds the best fit threshold, the system may simply choose to not apply any glare reduction correction to the image or to apply an alternative glare reduction technique (e.g., a content-agnostic glare reduction technique). According to some implementations, the best fit threshold may be selected so that the system errors on the side of not making a correction (rather than making an aesthetically unpleasing correction) in the event that a poor match is found.

Assuming that one or more of the identified likely glare-containing regions in the captured image actually do represent a reflection of the screen contents of a display screen (or other light-projecting element) at the moment of image capture, they will likely represent a transformed and/or geometrically distorted version of the actual screen content or pattern of projected light. This may be due to, e.g., the curvature, size, location and/or optical properties of the surface (e.g., an eyeglass lens) that the screen contents or projected light are being reflected off of. Thus, according to some embodiments, in order to find the aforementioned best fit between the content image (e.g., the display screen's contents) at the moment of image capture and the glare-containing regions in the captured image, one or more transformations and/or geometric distortions may need to be applied to the content image.

According to some embodiments, the first step in attempting to find a best fit between the content image (e.g., the display screen's contents) and the unwanted glare in the captured image is to attempt to match the size of the glare to the screen contents. Because the glare-reduction techniques described herein are content-aware, the screen contents at the moment of image capture may be retrieved by the application software (e.g., operating system software) and then initially downscaled to a size proportional to the size of the identified likely glare-containing regions. In embodiments where face detection is utilized (e.g., when reducing glare in user-worn eyeglasses is the only concern), the screen contents may also initially be downsized based on the dimensions of the detected face's bounding box. The initial estimated size downscaling parameter may thus serve as a first guess in an iterative parameter sweep search to find a best size fit between the screen contents and the unwanted glare. The downscaling parameter sweep may be implemented using standard numerical methods for minimization or optimization, including a Least Squares method, a Conjugate-Gradient method, or any similar parameter fitting methodology.

Next, the downscaled screen contents may then be preprocessed by applying one or more geometric distortion models to attempt to fit the distorted version of the content image to its corresponding representation in the unwanted glare regions in the captured image. The geometric distortion model can be expressed as a transformation matrix to account for the physical effects of the non-flat optical surface of the eyeglasses. The coefficients of such transform matrices may then be iteratively swept over, e.g., over a range of likely candidate coefficient values, in order to find the transformation coefficients that give the best fit with the unwanted glare in the captured image.

According to some embodiments, the iterative transformation matrix parameter sweep process may be conducted in series or in parallel. After applying the geometric distortion model to the downscaled content image, the resulting image may be swept across the captured image. As mentioned above, for added efficiency, this sweeping process may be constrained by the bounding box provided by the face detection process and/or any other regions identified during the glare-containing regions identification process, such as that described above in reference to FIG. 3. The objective of this parameter sweep is to find a best fit, e.g., by finding a maximal value of the correlation function, between the downscaled-and-distorted content image and the glare-containing image captured by the camera.

After the parameter sweep has been completed, the maximal value of the correlation function represents the geometric model and the spatial position of the best fit between the downscaled-and-distorted content image and the glare-containing image captured by the camera. In other words, at this point in the process, the position of the unwanted reflected screen glare has been located, and the best fit shape of the eyeglasses lens has been determined.

Finally, using the aforementioned simplification of a perfectly reflective eyeglass surface (i.e., using the simplified assumption that the transmission coefficient of the reflective surface in the scene is 0.0, and that its reflection coefficient is 1.0), a corrected image may be produced simply by subtracting the model-fitted, geometrically-distorted screen image from the captured image. As was illustrated in FIG. 2, because the reflected light sources are additive, the resulting image is an image that ideally represents only the scene's ambient illumination, but nonetheless reduces the impact or presence of unwanted glare.

Figure 4A:
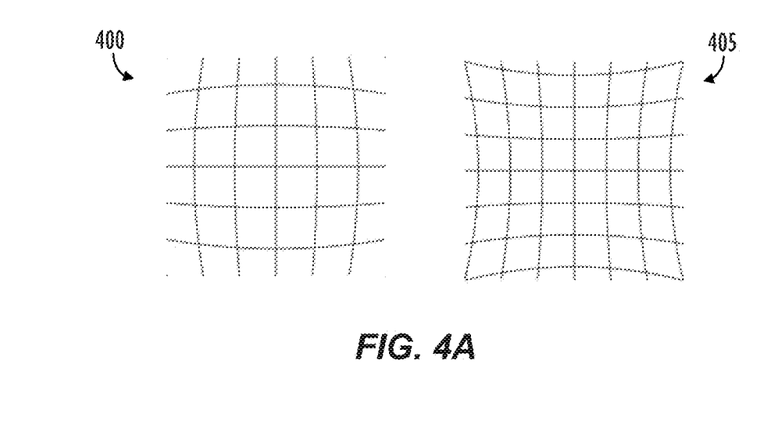
FIG. 4A illustrates exemplary screen distortions, in accordance with one or more embodiments.

As mentioned above, because of the distortions to screen content (or other content image information) caused by the reflection off of curved surfaces in the captured scene (e.g., a user's eyeglass lenses), the reflected screen content may often be distorted from its original appearance on the display screen when it is represented in a captured image. Referring now to FIG. 4A, exemplary screen distortions 400 and 405 are illustrated, in accordance with one or more embodiments. These distortions illustrate the manner in which the display screen contents may need to be stretched, skewed, warped, etc., in order to find a best fit with their respective reflected representations in the captured image. The most common transforms are often described qualitatively as "stretch," "skew," "pin-cushion," "trapezoid," and/or "barrel" distortions. All of these qualitative descriptions may be represented numerically as a transform matrix, whose coefficients comprise the parameters that are swept over during the search for finding the best fit between the content image and the unwanted glare in the captured image.

Figure 4B:
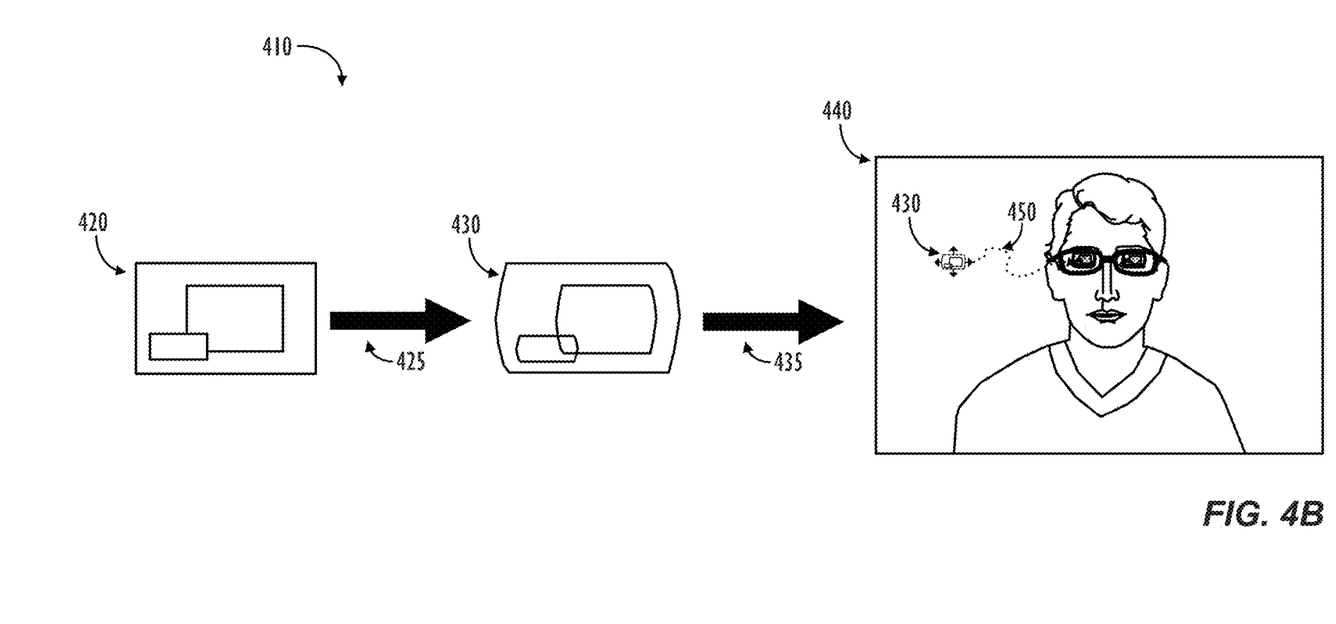
FIG. 4B illustrates a transformation and spatial alignment process for identifying a best fit between a content image and a captured image, in accordance with one or more embodiments.

In addition to being distorted, the content image may also need to be spatially transformed to be matched with the reflected region in the captured image. Referring now to FIG. 4B, a transformation and spatial alignment process 410 for identifying a best fit between a content image and a captured image is illustrated at a high-level, in accordance with one or more embodiments. As described above, first, the content image may be downscaled based on the estimated size of the reflective objects (e.g., objects containing the unwanted glare regions) in the captured image (420). Next, the downscaled content image may be transformed by the determined matrix of best fit (425). Next, the downscaled-and-distorted content image (430) may be spatially correlated (435) over the captured image containing the undesired objects (440). As illustrated, the downscaled-and-distorted content image (430) may be swept (450) over the captured image (440) until the position of best fit between the downscaled-and-distorted content image and undesired object(s) is located, at which point the contents of the downscaled-and-distorted content image may be subtracted from the captured image (e.g., on a pixel-by-pixel basis) to remove (or at least partially remove) the undesired object(s) from the image.

Figure 5A:
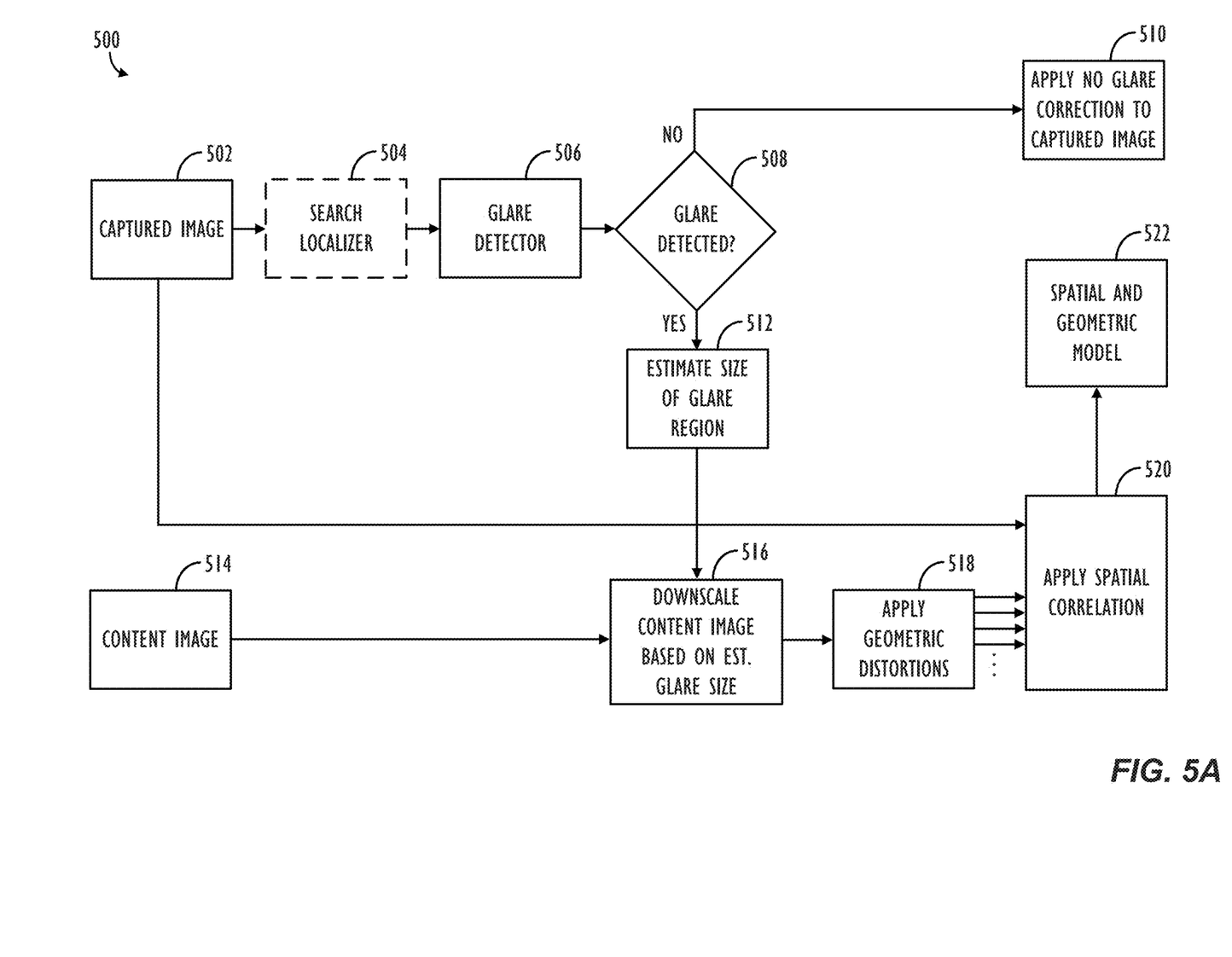
FIG. 5A shows, in flowchart form, a method for detecting undesired objects, e.g., glare, in a captured image, in accordance with one or more embodiments.

Now that several of the individual components of the glare reduction process have been described in some detail, a high-level overview of one embodiment of the entire glare reduction process will be described. Referring now to FIG. 5A, a method (500) for detecting an undesired object, e.g., glare, in a captured image is shown in flowchart form, and in accordance with one or more embodiments. As illustrated in FIG. 5A, the captured image (502) may initially be fed into a search localizer (504). The search localizer may comprise, e.g., a face detection process, the output of which is a bounding box indicating a size and a position where a user's face was found in the captured image. In other embodiments, the search localizer may comprise an object detector algorithm trained to detect certain general reflective surfaces commonly found in captured scenes, e.g., objects such as frames, pictures, windows, mirrors, eyeglasses, sunglasses, eyes, etc., in which any glare in an image (if present) is likely to occur. Such object detector algorithms may also return bounding boxes and coordinates within the image, similar to face detection algorithms.

The search localizer (504), e.g., the face bounding box mentioned above, may thus be used to constrain a 'coarse' glare detector (506) process, such as that described above with reference to FIG. 3. In some embodiments, the glare detector may be implemented as a luminance detector, as regions with large luminance values tend to represent the likely positions of any glare in the scene. The luminance detector could be further augmented using any similar binary classifier algorithm to determine the presence or absence of glare in the image. Next, a threshold glare detection inquiry is made at Step 508. If no likely glare regions are detected (i.e., 'N' at Step 508), a determination is made that no glare correction is needed, and the process 500 may simply proceed to Step 510 and apply no glare correction to the captured image.

If, instead, one or more likely glare regions are detected (i.e., 'Y' at Step 508), the process may proceed to Step 512 to estimate said glare region's size. According to some embodiments, the size of the glare region may be estimated using a region-growing or pixel-counting method. In other embodiments, a simple heuristic estimate may be applied, e.g., based on the size of the detected face, the position and size of the eyes in the face, the size of the likely glare-possessing object in the scene, etc. The estimated glare size from Step 512 may then be provided as an initial parameterization for the downscaling and geometric distortion of the content image.

At this point in the process, there is sufficient information known about the presence and size of the glare regions in the captured image to begin to process the content image (514). First, the content image 514 may be inverted to accommodate the basic property of a reflected image, i.e., that it is a 'mirror' image of the original content. (This inversion may be achieved simply by adding a negative sign to the first affine transformation matrix that is applied to the content image.) Next, at Step 516, the content image may be further modified, e.g., downscaled based on the estimated glare region size from Step 512. In some implementations, the downscaling algorithm may also implement the reflection inversion, as this type of affine transform for image processing is commonly implemented using hardware acceleration. In other implementations, the reflection and scaling may be achieved in separate steps.

In some embodiments, affine transformations may also be used to optimize the best fit for situations where the camera is relatively far away (e.g., positioned three feet off to the left) of the display screen or other light-projecting element. In other words, numerical optimizations may be used to calculate the maximum correlation function that can possibly be obtained, e.g., by checking all possible values of the affine transformation. Various efficient numerical methods may be used to find the maximum correlation function, such as Least Squares, Conjugate Gradient Descent, etc.

Next, at Step 518, the geometric distortion model may be applied to create a further modified representation of the content image. According to some embodiments, the geometric distortion may be modeled as a combination (e.g., a composition) of one or more stretch, skew, and/or simple distortion matrices. Such distortions are typically sufficient to provide good matching to the reflected glare on most images of eyeglasses, and are computationally efficient to implement. By composing multiple matrices, wherein the final approximation matrix is the multiplication of all the determined parameters of each of the matrices, the process can attempt to account for all possible geometric distortions (e.g., the shape of the eyeglass lens, the placement of camera, the tilt of the user's head, etc.). A more elaborate physical or optical model, such as a model based on optical ray tracing, could be implemented if sufficient computational resources were available and/or if such a model were necessary to match the reflections off more complex shapes in the captured scene.

In some implementations, a brute force approach may be implemented when searching for the correlation function providing the best fit between the content image and the unwanted reflections that simply tests all possible geometric distortion parameters over all possible ranges. However, such an approach is computationally expensive, thus, in other implementations, a sparse subset of all possible geometric distortion parameters may be tested. According to such implementations, a mathematical optimization methodology may be used, such as the Least Squares method or the Conjugate-Gradient method, to calculate the maximum possible value of the correlation function, i.e., by checking over less than all possible values of the affine transformation parameters.

According to still other embodiments, Deep Neural Networks (DNNs) may be used to search for and determine the most likely candidate parameter values for a large parameter sweep. Alternately, pre-learned parameters that have been found to work for certain types of objects (like eyeglasses, mirrors, etc.) may be cached for fast access and use, either as the actual parameters for a subsequent image or simply as a starting point to locate the best parameters for a subsequent image.

As mentioned above, the parameter sweep to determine the geometric distortion providing the best fit between the content image and the glare regions may be implemented in series or, more preferably, in parallel (as represented by the multiple parallel arrows between Steps 518 and 520 in FIG. 5A). Searching for the geometric distortion parameters of best fit in parallel can lead to further efficiencies in implementing the glare reduction techniques described herein. As a final measure, bounding times on the performance of the parameter sweeping process may be set (e.g., 1 second, ⅓₀ of a second, etc.) to ensure that the search does not extend beyond a desired amount of time.

Finally, the spatial correlation (520) between the content image and the captured image may also be determined (i.e., specifying where in the captured image the unwanted glare regions are located), leading to a spatial and geometric model (522) of the unwanted glare in the captured image.

If desired, according to some embodiments, a calibration process may be utilized by the system prior to attempting to detect the glare in captured images. For example, the display screen may be used to project a "probe pattern" prior to capture, which can improve the ability of the system to locate reflective objects (e.g., eyeglasses) during actual operation. The information learned during the calibration process may also then be preserved as a "seed value" for the parameter sweeping processes described above in any subsequent uses of the glare reduction process. Notably, if the projected light source is an infrared light source (or other invisible light source), the calibration process may be conducted without even alerting the user of the device.

Now that a method for developing a model of the position and geometry of the unwanted reflection in a captured image has been discussed, a method (550) for reducing glare will be discussed, e.g., as is shown in flowchart form in FIG. 5B, in accordance with one or more embodiments. First, the output from FIG. 5A, i.e., the model (522) of the position and geometry of the unwanted reflection in the capture image, is passed into method 550. The content image (514) may then effectively be reprocessed by applying the parameters from the model 522 discovered via the process of FIG. 5A. For example, the content image 514 may be downscaled (516) and/or distorted (518) using the distortion parameters from model 522.

At Step 552, the downscaled and distorted content image may then be spatially aligned and subtracted, e.g., on a pixel-by-pixel basis, from the original captured camera image (502). While image subtraction tends to work well for images in a linearized sRGB or YUV color space, additional chrominance downsampling and/or additional chrominance suppression may also be applied (e.g., to be more aggressive at subtracting the color signals than the brightness signal) to achieve a more natural-looking corrected image. In other embodiments, any desired image compositing technique may be employed to correct and/or remove the unwanted glare from the original captured image.

Referring back to the simplified light model illustrated in FIG. 2, the final glare-corrected image (556) is thus a reconstructed image, depicting a scene that is physically equivalent to the original scene, but without the unwanted illumination (e.g., glare) from the display screen (or other light-projecting element in the scene), and wherein content behind the user's eyeglasses (e.g., the user's eyes) can be seen in the corrected image—rather than the aesthetically unpleasing glare regions from the original captured image.

In practice, imperfections and non-ideal model fitting may yield an imperfect output image. Thus, according to some embodiments, the corrected image may be blended and/or smoothed with its surroundings in the image (Step 554) to generate the final version of the glare-corrected image (Step 556). In some implementations, random 'white' noise may be added to the image to improve the visual, aesthetic quality of the glare-corrected regions within the image. The corrected regions may also be filtered, smoothed, and/or may have additional pixel-level corrections applied (e.g., gamma correction, white balance correction, black level compensation, tone mapping, etc.), so that the corrected regions have a better visual match with the rest of the image.

In still other embodiments, a spectral estimation filter or a predictive error filter may be used to match the noise statistics of the corrected region with the surrounding region in the image. These filters may operate by collecting information about a region of interest, i.e., a region where unwanted glare is being corrected, and then estimate synthetic pixel values that can be used to fill in regions in the image that need correction. According to some embodiments, the pixel statistics that are gathered to estimate the synthetic pixel values may be constrained to a limited subset of pixels in the image, e.g., a face detection bounding box, a generalized detected object bounding box, or the size and shape of the detected glare region, etc., thereby providing greater efficiency in the statistical matching process and creating more natural-looking synthetic pixels for the corrected region of interest.

In still other embodiments, because the contents of the display screen are made available to all stages of the glare reduction image processing algorithm, some implementations may take special steps to ensure a secure computational context is provided. For example, if one or more of the graphical elements on the display screen at the moment of image capture are tagged, coded, or otherwise known to possess information that the user does not intend to transmit (e.g., a user's financial information or a corporate document that is subject to a non-disclosure agreement, etc.), various removal techniques (e.g., the glare removal techniques described above) or obfuscation techniques (e.g., blurring, blacking out, whiting out, etc.) may be applied to the reflected representations of such graphical elements in the corrected captured image. In some embodiments, the obfuscation or removal of reflected information may be done, rather than full glare removal (e.g., to further enhance efficiency). In still other embodiments, the obfuscation or removal of reflected information may simply be done as part of the full glare-correction process. These techniques can prevent the inadvertent, undesired, or unintended transmission of any data that was visible on the user's screen (i.e., in the form of reflected content) or even data that was not visible on the user's screen or in the user's environment (e.g., in the form of infrared light, ultraviolet light, or other forms of structured or patterned light not visible to the human eye) that the user did not desire or intend to transmit to a recipient.

Figure 6:
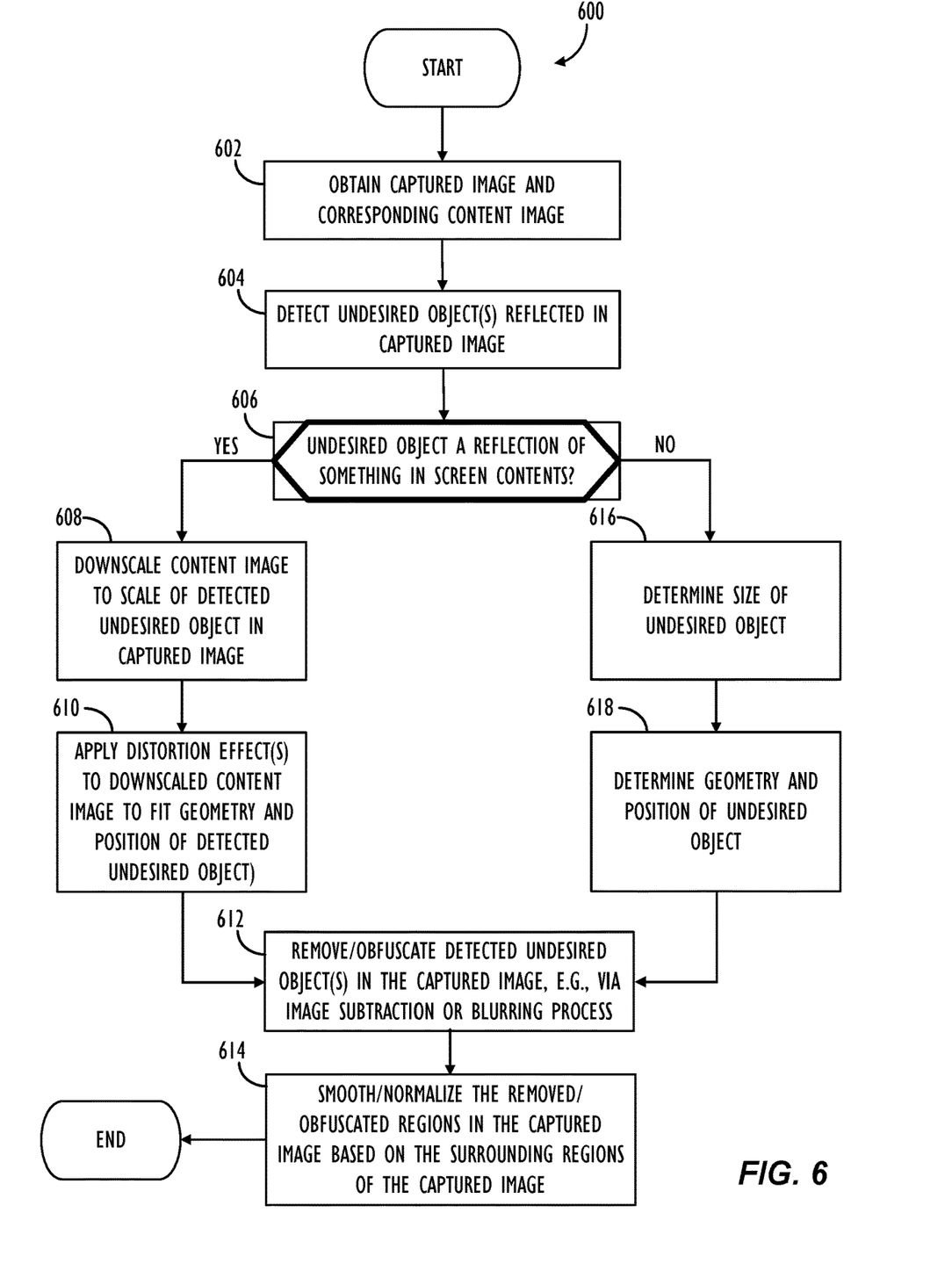
FIG. 6 shows, in flowchart form, a method for removing or obfuscating undesired objects reflected in a captured image, in accordance with one or more embodiments.

As discussed above, in some images, the undesired regions may comprise reflections of screen content or other patterned light projected into the scene, e.g., by a light-projecting element. However, in other images, the undesired regions may comprise reflections of other objects in the user's environment that they do not intend to appear in the captured image. Referring now to FIG. 6, a method 600 for removing or obfuscating undesired objects reflected in a captured image is shown in flowchart form, in accordance with one or more embodiments. First, the process begins by obtaining the captured image and the corresponding content image, as has been described above (Step 602). According to some embodiments, the first captured image may be captured at a first time, and the first content image represents the contents of a display screen (or other light-projecting element) at the first time. Next, at Step 604, the process may detect undesired objects reflected in the captured image. As mentioned above, the undesired objects may comprise unwanted glare (e.g., reflecting the contents of a display screen that a user captured in the image was looking at when the image was captured). However, the undesired objects may also comprise reflections of a pattern of structured light or other light projected into the scene by a light-projecting element in communication with the video image capture device. In still other embodiments, the undesired object may simply be a reflection of an object that is not aesthetically desired to be in the final image (e.g., a beer glass, another person's face, the arm of a person holding a mobile image capture device to take a 'selfie' image, etc.). Such objects may be identified and located, e.g., via the use of pre-trained object classifiers or other heuristic models.

Next, the process may determine whether or not the undesired object is a reflection of some portion of display screen content (Step 606). As mentioned above, some undesired objects may comprise patterns of light and/or reflections of other objects that simply happen to be located in the scene at the time of image capture. The removal of such objects may not be as readily aided by an awareness of display screen content, since they were not actually represented on the display screen at the time of image capture. Thus, if the undesired object is a not a reflection of display screen content (i.e., 'N' at Step 606), the process may proceed to Step 616.

At Step 616, a size of the undesired object may be determined, followed by, at Step 618, a characterization of the geometry and position of the undesired object in the captured image (e.g., the shape, orientation, distortion, etc.). Once the size, shape, location, and orientation of the 'non-screen' content image undesired object are known, the process may proceed to Step 612, wherein the undesired object may be removed, partially removed, modified, or obfuscated, e.g., via more traditional 'non-screen content aware' methods, such as blurring out, blacking out, whiting out, writing over with nearby image content, etc. In some embodiments, the amount, degree, location, and/or implementation of the actual image modification process to remove or partially remove the undesired object may be based, at least in part, on the makeup of the content image. Finally, at Step 614, the correction areas may be smoothed/normalized based on the surrounding regions in the captured image, so as to make the corrections more aesthetically pleasing, and the process may end.

Figure 5B:
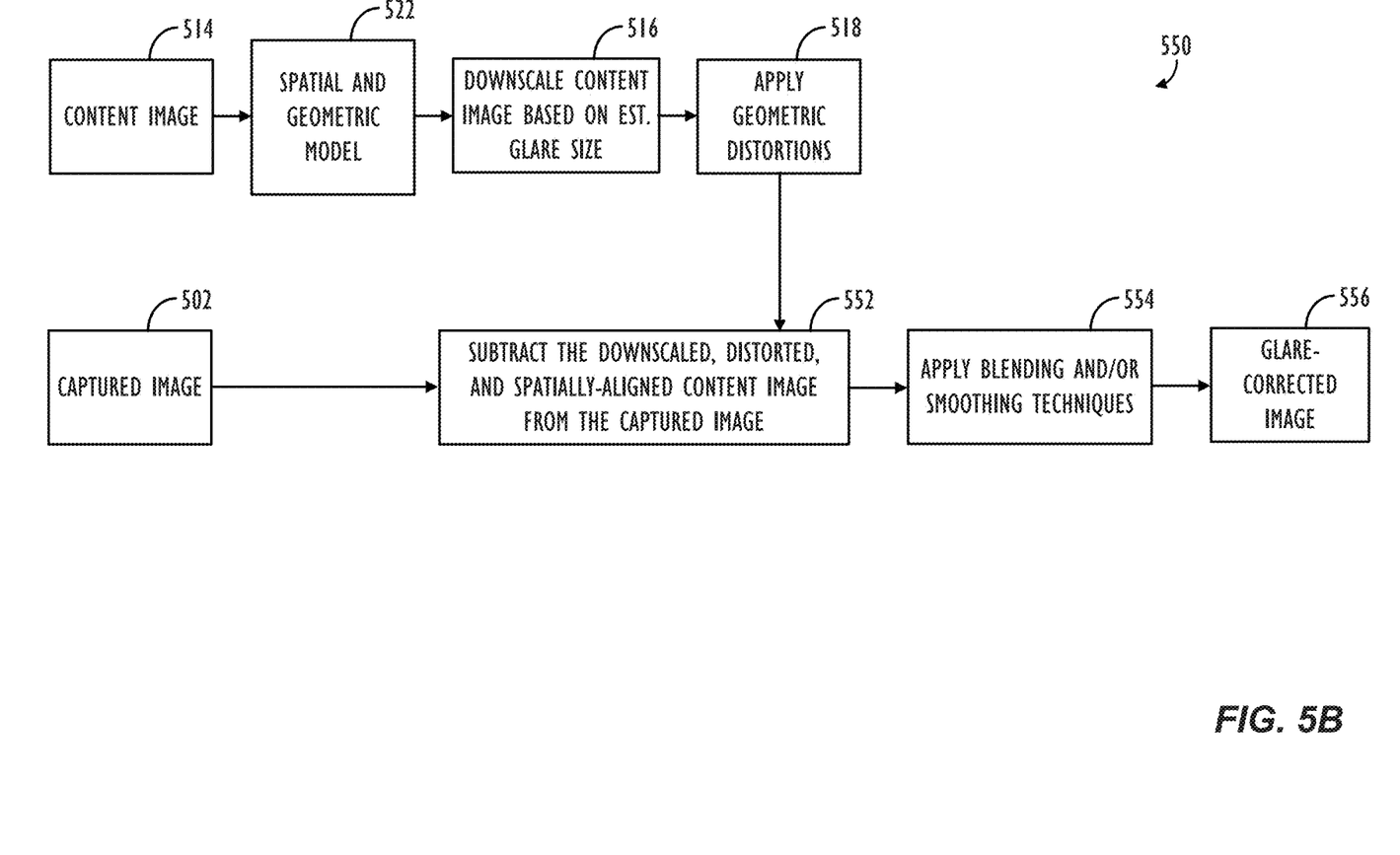
FIG. 5B shows, in flowchart form, a method for reducing the effects of undesired objects, e.g., glare, in a captured image, in accordance with one or more embodiments.

If, instead (as is the more common case), the undesired object is a reflection of some portion of a display screen content (i.e., 'Y' at Step 606), the process may proceed to Step 608, and proceed largely as has been described above, e.g., with reference to FIGS. 5A-5B. That is, at Step 608, the content image may be downscaled and then, at Step 610, distorted so as to provide a best fit between the content image and the appearance of the undesired reflection of the screen contents in the captured image. Finally, as described in detail above, the process may proceed to Step 612, wherein the undesired object may be removed, partially removed, or obfuscated, e.g., via the aforementioned image subtraction processes, and then, at Step 614, the correction areas may be smoothed/normalized based on the surrounding regions in the captured image, so as to make the corrections more aesthetically pleasing, and the process may end.

Exemplary Electronic Device

Figure 7:
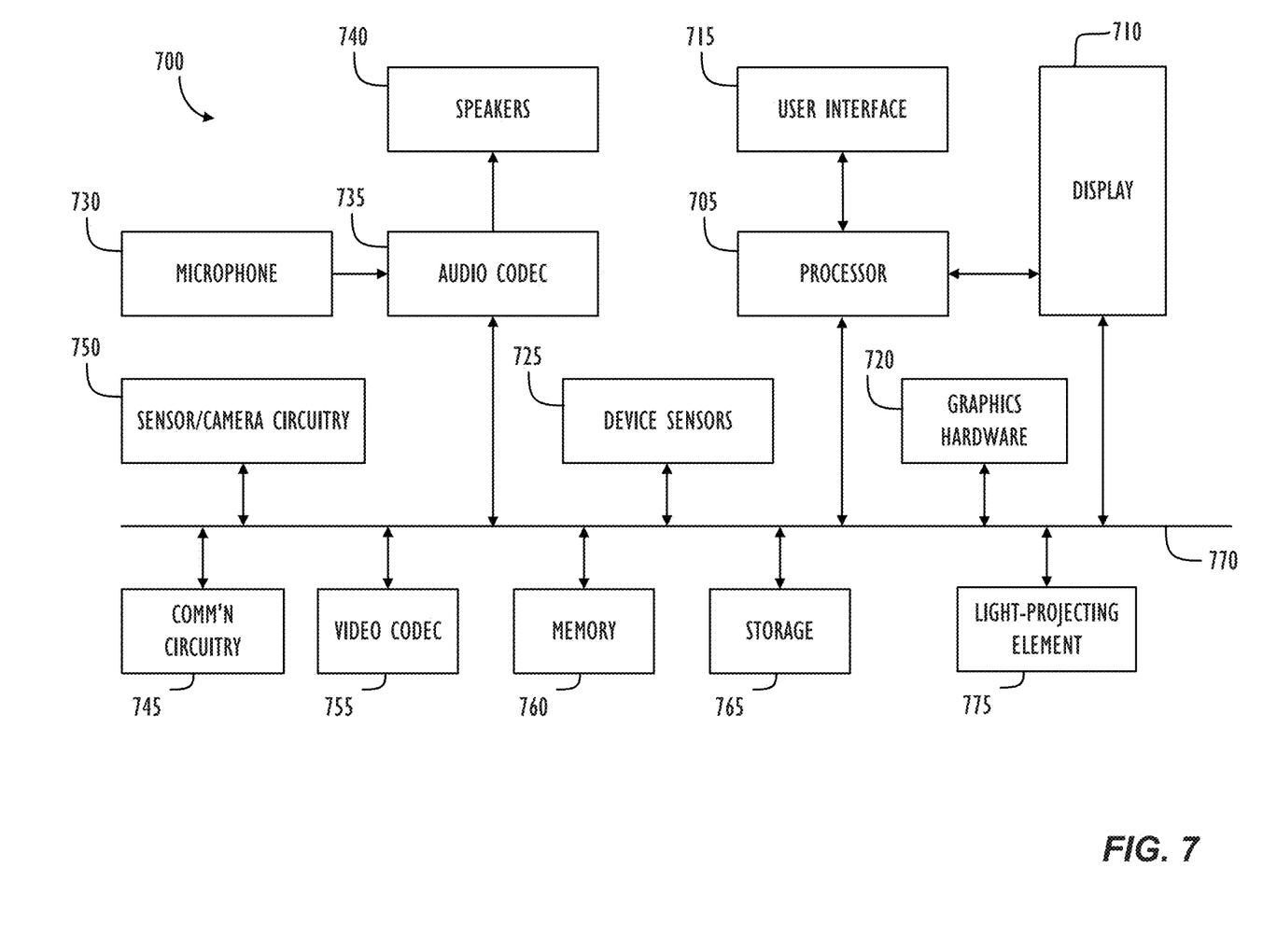
FIG. 7 shows, in block diagram form, a multi-function electronic device, in accordance with one embodiment.

Referring to FIG. 7, a simplified functional block diagram of illustrative electronic device 700, e.g., an electronic device capable of performing any or all of the various glare reduction techniques described herein, is shown, according to one or more embodiments. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, video codec(s) 755, memory 760, storage 765, communications bus 770, and light-projecting element(s) 775.

Processor 705 may execute instructions necessary to carry out or control the operation of many functions performed by device 700, e.g., such as the generation and/or processing of video image frames in accordance with the various embodiments described herein. Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular images(s) that the user would like to have glare correction applied to (e.g., by clicking on a physical or virtual button at the moment the desired image or image file is being displayed on the device's display screen). In one embodiment, display 710 may display a live video stream as it is captured (and/or other graphical user interface objects under the control of the device's operating system) while processor 705 and/or graphics hardware 720 and/or image capture circuitry 750 contemporaneously (or subsequently) generate a corrected version of the captured video stream (e.g., a glare-reduced version), before storing the corrected video images in memory 760 and/or storage 765.

Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs).

Image capture circuitry 750 may capture video images that may be processed to generate corrected video images (e.g., glare-reduced images) in accordance with this disclosure. Output from image capture circuitry 750 may be processed, at least in part, by video codec(s) 755 and/or processor 705 and/or graphics hardware 720, and/or a dedicated image processing unit incorporated within circuitry 750.

Light-projecting element 775, i.e., for embodiments wherein the light projected onto the face or body of a user (or otherwise projected into the captured environment) comes from a source other than, or in addition to, the light of the display 710 may comprise any manner of light-emitting element that is in communication with the other components of electronic device 700, e.g., a laser; an infrared (IR) light; a projector; a flash strobe; or other source of structured or patterned light. According to some embodiments, the particular composition and/or coloration of the light-projecting element 775 during image capture may also be known to electronic device 700, so that the reflections of such light may more readily located and removed or obfuscated (e.g., based, at least in part, on the amount, location and/or composition of the content image) in the corrected version of the captured image.

Captured images may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other).

The invention claimed is:

1. A non-transitory program storage device comprising instructions stored thereon to cause one or more processors to:
   obtain a first captured image;
   obtain a first content image corresponding to the first captured image, wherein the first content image comprises at least a portion of content being displayed on a screen when the first captured image was captured;
   detect a first region in the first captured image, wherein the first region comprises a reflection of a first portion of the first content image;
   create a modified representation of the first content image based on a size and a geometry of the first region in the first captured image;
   modify the first region in the first captured image based, at least in part, on the modified representation of the first content image, thereby creating a corrected image; and
   store the corrected image in a memory.

2. The non-transitory program storage device of claim 1, wherein the first captured image is captured at a first time, and wherein the first content image represents the content being display on the screen at the first time.

3. The non-transitory program storage device of claim 1, wherein the reflection comprises a reflection in a lens worn on a face of a user appearing in the first captured image.

4. The non-transitory program storage device of claim 3, wherein the instructions to detect a first region in the first captured image further comprise instructions to:
   detect a location and bounding box of the face of the user appearing in the first captured image; and
   limit a search to detect the first region in the first captured image to the detected bounding box of the face.

5. The non-transitory program storage device of claim 1, wherein the instructions to detect a first region in the first captured image further comprise instructions to:
   detect luminance values of pixels within one or more regions of the first captured image.

6. The non-transitory program storage device of claim 1, wherein the first portion of the first content image comprises at least one of: an electronic document; a graphical user interface object; a string of alphanumeric characters; a pattern of visible structured light; and a pattern of invisible structured light.

7. The non-transitory program storage device of claim 1, wherein the instructions to create a modified representation of the first content image comprise instructions to:
   determine transformation parameters for the first content image based on a best fit with the size and the geometry of the first region; and
   apply the determined transformation parameters to the first content image to create the modified representation of the first content image.

8. The non-transitory program storage device of claim 7, wherein the instructions to determine transformation parameters for the first content image based on a best fit with the size and geometry of the first region further comprise instructions to:
   perform an iterative parameter sweep search.

9. The non-transitory program storage device of claim 7, wherein the instructions to determine transformation parameters for the first content image based on a best fit with the size and geometry of the first region further comprise instructions to:
   determine one or more of the following: an affine transformation; a mesh transformation; and a warp transformation.

10. The non-transitory program storage device of claim 1, wherein the instructions to modify the first region further comprise instructions to perform at least one of the following:
    perform an image subtraction operation to subtract the modified representation of the first content image from the first captured image at a location of the first region;
    partially remove the modified representation of the first content image from the first captured image at the location of the first region; and
    obfuscate the first region in the first captured image.

11. An image processing method, comprising:
    obtaining a first captured image at a first time;
    obtaining a first content image comprising at least a portion of the contents being displayed on a display screen at the first time, wherein the display screen projects light into the first captured image at the first time;
    detecting a first region in the first captured image, wherein the first region comprises a reflection of a first portion of the first content image;
    creating a modified representation of the first content image based on a size and a geometry of the first region in the first captured image;
    modifying the first region from the first captured image based, at least in part, on the modified representation of the first content image, thereby creating a corrected image; and
    storing the corrected image in a memory.

12. The method of claim 11, wherein creating a modified representation of the first content image further comprises:
    determining transformation parameters for the first content image based on a best fit with the size and the geometry of the first region; and
    applying the determined transformation parameters to the first content image to create the modified representation of the first object.

13. The method of claim 12, wherein determining transformation parameters for the first content image based on a best fit with the size and the geometry of the first region further comprises:
    performing an iterative parameter sweep search.

14. The method of claim 13, wherein the iterative parameter sweep search is performed as a parallelized operation.

15. The method of claim 11, wherein detecting a first region in the first captured image comprises applying a trained object detector to the first captured image.

16. A device, comprising:
    one or more light-projecting elements;
    an image sensor;
    a memory communicatively coupled to the image sensor;
    one or more processors operatively coupled to the image sensor and the memory configured to execute instructions causing the one or more processors to:
       obtain a first captured image, wherein the first captured image is captured by the image sensor at a first time;
       obtain a first content image, wherein the first content image comprises information indicative of a content of at least a portion of light projected by the one or more light-projecting elements during the capture of the first captured image at the first time;
       detect a first region in the first captured image, wherein the first region comprises a reflection of a first portion of the first content image;
       determine a first characteristic of the first region in the first captured image;
       remove the first region from the first captured image based, at least in part, on the determined first characteristic, thereby creating a corrected image; and
       store the corrected image in the memory.

17. The device of claim 16, wherein the reflection comprises a reflection in a lens worn on a face of a user appearing in the first captured image.

18. The device of claim 16, wherein the first region comprises at least one of: an electronic document; a graphical user interface object; a string of alphanumeric characters; a pattern of visible structured light; and a pattern of invisible structured light.

19. The device of claim 16, wherein the determined first characteristic comprises at least one of: a size; a location; and a geometry of the first region.

20. The device of claim 19, wherein one of the one or more light-projecting elements comprises: a display screen; a laser; an infrared (IR) light; an ultraviolet light; an invisible light source; a projector; or a flash strobe.

* * * * *

UNITED STATES PATENT AND TRADEMARK OFFICE
CERTIFICATE OF CORRECTION

PATENT NO. : 10,825,157 B2
APPLICATION NO. : 16/134112
DATED : November 3, 2020
INVENTOR(S) : Nader W. Moussa Page 1 of 1

It is certified that error appears in the above-identified patent and that said Letters Patent is hereby corrected as shown below:

In the Claims

Claim 11, at Column 17, Line 56, replace "contents" with -- content --

Signed and Sealed this
Twenty-second Day of December, 2020

Andrei Iancu
*Director of the United States Patent and Trademark Office*